United States Patent
Wang et al.

(10) Patent No.: US 9,513,681 B2
(45) Date of Patent: Dec. 6, 2016

(54) SYSTEMS AND METHODS FOR CONTROLLING INRUSH ELECTRICAL CURRENTS USING A VIRTUAL MILLER CAPACITOR AND A METAL-OXIDE-SEMICONDUCTOR FIELD-EFFECT TRANSISTOR (MOSFET)

(71) Applicant: Dell Products, L.P., Round Rock, TX (US)

(72) Inventors: Lei Wang, Austin, TX (US); Mehran Mirjafari, Austin, TX (US); Padmanabh R. Gharpure, Round Rock, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 123 days.

(21) Appl. No.: 14/533,014

(22) Filed: Nov. 4, 2014

(65) Prior Publication Data

US 2016/0126859 A1 May 5, 2016

(51) Int. Cl.
*H02M 1/36* (2007.01)
*G06F 1/26* (2006.01)
*H02M 7/217* (2006.01)
*H02H 9/02* (2006.01)
*H02M 1/32* (2007.01)
*H02M 1/00* (2006.01)

(52) U.S. Cl.
CPC ............... *G06F 1/263* (2013.01); *H02M 1/36* (2013.01); *H02M 7/2176* (2013.01); *H02M 2001/0045* (2013.01)

(58) Field of Classification Search
CPC .... H03K 17/0822; H02H 9/002; H02H 9/025; H02H 3/087; G05F 1/468; G05F 1/569; H02M 1/36
USPC ................................... 361/93.9; 323/89, 908
See application file for complete search history.

(56) References Cited

U.S. PATENT DOCUMENTS

| 5,079,455 | A | * | 1/1992 | McCafferty | ........ H03K 17/0822 323/908 |
|---|---|---|---|---|---|
| 5,087,871 | A | * | 2/1992 | Losel | ..................... H02H 9/001 323/299 |
| 5,122,724 | A | * | 6/1992 | Criss | ..................... H02H 9/001 323/222 |

(Continued)

OTHER PUBLICATIONS

Lai, et al., "New AC/DC Converter Considering Both Inrush Current Limitation and Start-up Time," Apr. 2013, IEEE 10th International Conference on Power Electronics and Drive Systems (PEDS), pp. 1231-1235.

(Continued)

*Primary Examiner* — Gary L Laxton
(74) *Attorney, Agent, or Firm* — Fogarty, L.L.C.

(57) ABSTRACT

Systems and methods for controlling inrush electrical currents (e.g., resulting from power-on event, etc.) using a virtual Miller capacitor and a metal-oxide-semiconductor field-effect transistor (MOSFET). In an illustrative, non-limiting embodiment, a method may include receiving alternating current (AC) power and providing the AC power to an electronic circuit, at least in part, via a bulk capacitor coupled to a field-effect transistor (FET), wherein the FET is coupled to a virtual Miller capacitor circuit configured to limit an amount of AC inrush current provided to the bulk capacitor.

14 Claims, 3 Drawing Sheets

(56) References Cited

U.S. PATENT DOCUMENTS

| | | | | |
|---|---|---|---|---|
| 5,909,364 A | * | 6/1999 | Rivet | H02M 1/4208 323/299 |
| 6,445,165 B1 | * | 9/2002 | Malik | H02H 9/001 323/222 |
| 6,807,039 B2 | * | 10/2004 | Priest | H02H 9/004 361/93.1 |
| 6,903,583 B1 | * | 6/2005 | Habib | G06F 1/30 327/143 |
| 8,630,078 B2 | | 1/2014 | Chai et al. | |

OTHER PUBLICATIONS

Mitter, "Active Inrush Current Limiting Using MOSFETs" 1995, Motorola, Inc., pp. 1-14.

Lee, et al., "Comparative Analysis of Active Inrush Current Limiter for High-Voltage DC Power Supply System," Oct. 2012, 2012 IEEE Vehicle Power and Propulsion Conference (VPPC).

Kislovski, et al., "Fast Active Inrush Current Limiter for Boost-Based Resistor Emulators," Nov. 1994, 16th International Telecommunications Energy Conference, pp. 649-652.

Pearson, "Current limiting key to hot-swap circuit protection," Sep. 2002, EE Times, pp. 1-6.

Pezeshkian, "Very low-power inrush-current limiter protects hot-pluggable apps," May 2010, Electronic Design, pp. 1-3.

Power One, "Inrush current control; Application Note," Mar. 2001, pp. 1-3.

Raspotnig, "Power supplies with significantly reduced inrush current," PULS Application Note, Feb. 2006, pp. 1-6.

\* cited by examiner

SYSTEMS AND METHODS FOR CONTROLLING INRUSH ELECTRICAL CURRENTS USING A VIRTUAL MILLER CAPACITOR AND A METAL-OXIDE-SEMICONDUCTOR FIELD-EFFECT TRANSISTOR (MOSFET)

FIELD

This disclosure relates generally to electronics, and more specifically, to systems and methods for controlling inrush electrical currents (e.g., resulting from power-on event, reset, etc.) using a virtual Miller capacitor and a metal-oxide-semiconductor field-effect transistor (MOSFET).

BACKGROUND

The following discussion sets forth the inventors' own knowledge of certain technologies and/or problems associated therewith. Accordingly, this discussion is not an admission of prior art, and it is not an admission of the knowledge available to a person of ordinary skill in the art.

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Of course, IHSs and their various components are powered by electricity. To that end, one or more power supply unit(s) (PSUs) may be employed that include electronic circuitry configured to provide predetermined amounts of electrical power (e.g., voltage and/or current) having a given specification. In the case of an alternating power (AC) PSU, there is typically a bulky electrolytic capacitor present for energy storage requirements. Moreover, at power-on, there is heavy inrush current which flows through the circuit to charge the bulk capacitor. This inrush current puts heavy stresses on the components on the PSU as well as false tripping of the breakers and/or damaging of input fuse(s) and/or bridge rectifier(s).

Thus far, a few methods have been proposed and used to limit the problem of excessive inrush current on PSUs. Particularly, the proposed methods include: (a) the use of a negative temperature coefficient (NTC) thermistor in series with an input fuse, (b) use of an NTC thermistor or a power resistor shunted by a relay in series with either an input fuse or the bulk capacitor, and (c) use of an NTC thermistor or a power resistor shunted by a metal-oxide-semiconductor field-effect transistor (MOSFET) in series with either an input fuse or the bulk capacitor.

The first of the aforementioned methods or method "a"—that is, use of an NTC thermistor in series with an input line—does limit the initial inrush current at "cold" starts (e.g., at normal ambient temperature). It does not, however, prevent heavy inrush currents during "hot" starts (e.g., a reset after having operated for a period of time, or higher than normal ambient temperature). Also, the NTC thermistor placed in series with AC input is a constant source of loss and heat.

For this reason, some PSUs may use an NTC thermistor or a power resistor shunted by either a relay (method "b") or by a MOSFET (method "c"). The advantage of using an NTC thermistor over a power resistor is that the resistance of the NTC thermistor can be selected to be much higher at 25° C., as compared to the value of a power resistor. The benefit of using an NTC thermistor is that the instantaneous value of the inrush current peak is much lower at the beginning when compared to a power resistor; but, as current keeps flowing through the NTC thermistor, its resistance drops and the bulk capacitor gets charged faster. So the ratio of peak current to average current is much lower with the NTC thermistor than with a power resistor. Regardless, NTC thermistor solutions cannot provide a constant charge current, but only an exponential profile with a big front end (e.g., for the same amount of capacitor energy that needs to be charged, the peak inrush current of NTC thermistor and/or is much higher than average current).

Another major drawback of using an NTC thermistor (method "b") or a power resistor (method "c") is the overall size of the electronic parts and printed circuit board (PCB) layout constraints, particularly in high density or high power applications (e.g., Notebook adapters). For example, when NTC thermistors or a power resistor are used, the layout should be such that once the NTC or resistor is shunted by the relay, it does not get heated by the outside environment and has adequate airflow to keep its body temperature close to the operating ambient temperature, therefore ensuring that even during a "hot" start condition the inrush current is limited to a desired value.

Given a desired charging time (e.g., 100 ms), the size of either the NTC thermistor or power resistor is determined by the power needed to charge the bulk capacitor in such a short time frame. If the bulk capacitor has a capacitance of 450 uF, for example, that energy is approximately 25.9 J at 340 V (240 VAC). Thus, if the charging period is ~100 ms, the pulse power is around 260 W, which in turn mandates very large component sizes. In either case, relay adds to real estate causing it extremely difficult to accommodate it in the compact products.

Using a MOSFET instead of the relay in parallel with the NTC thermistor or power resistor (i.e., method "c") can provide benefits over method "b," because a MOSFET can be made much smaller than a relay. The power rating of MOSFETs is also very high because the selection has to have a relatively low equivalent series resistance and high current requirement; however, it is wasteful to skip the power capability of available MOSFET during inrush while just depending on bulky NTC or power resistor. Accordingly, to address these and other problems, the inventors hereof have developed systems and methods for controlling inrush electrical currents (e.g., resulting from power-on event, reset, etc.) using a virtual Miller capacitor and a MOSFET.

SUMMARY

Embodiments of systems and methods for controlling inrush electrical currents (e.g., resulting from power-on event, etc.) using a virtual Miller capacitor and a metaloxide-semiconductor field-effect transistor (MOSFET) are described herein. In an illustrative, non-limiting embodiment, a method may include receiving alternating current (AC) power; and providing the AC power to an electronic circuit, at least in part, via a bulk capacitor coupled to a field-effect transistor (FET), wherein the FET is coupled to a virtual Miller capacitor circuit configured to limit an amount of AC inrush current provided to the bulk capacitor.

The method may further comprise providing a current source coupled to the bulk capacitor and to the virtual Miller capacitor circuit. For example, a gate terminal of the FET may be coupled to a third terminal of the current source, a drain terminal of the FET may be coupled to a second terminal of the virtual Miller capacitor circuit and to a second terminal of the bulk capacitor, and a first terminal of the current source may be coupled to a first terminal of the virtual Miller capacitor circuit and to a first terminal of the bulk capacitor.

The second terminal of the virtual Miller capacitor circuit may be coupled to a non-inverting input of an internal amplifier, the first terminal of the virtual Miller capacitor circuit may be coupled to an inverting input of the internal amplifier, and a third terminal of the virtual Miller capacitor circuit may be coupled to an output of the internal amplifier through a capacitor.

The method may further comprise providing a rectifier circuit configured to receive the AC power, the current source coupled to the rectifier circuit. Also, in some implementations, the FET may be a MOSFET.

In an illustrative, non-limiting embodiment, a circuit may include a bulk capacitor; an FET coupled to the bulk capacitor; a virtual Miller capacitor circuit coupled to the bulk capacitor and to the FET; and a fast recovery diode coupled to the FET in a parallel configuration. The circuit may further include a current source coupled to the bulk capacitor and to the virtual Miller capacitor circuit. A gate terminal of the FET may be coupled to a third terminal of the current source, a drain terminal of the FET may be coupled to a second terminal of the virtual Miller capacitor circuit and to a second terminal of the bulk capacitor, and a first terminal of the current source may be coupled to a first terminal of the virtual Miller capacitor circuit and to a first terminal of the bulk capacitor. The second terminal of the virtual Miller capacitor circuit may be coupled to a non-inverting input of an internal amplifier, the first terminal of the virtual Miller capacitor circuit may be coupled to an inverting input of the internal amplifier, and a third terminal of the virtual Miller capacitor circuit may be coupled to an output of the internal amplifier through a capacitor.

The PSU further may include a rectifier circuit configured to receive an alternating current (AC) electrical power, and the current source may be coupled to the rectifier circuit. The virtual Miller capacitor circuit may be configured to control an amount of inrush current provided to the bulk capacitor during a powering on event.

In yet another illustrative, non-limiting embodiment, an information handling system (IHS) may include a central processing unit (CPU); and at least one power supply unit (PSU) coupled to the CPU, the PSU comprising: a bulk capacitor; a field-effect transistor (FET) coupled to the bulk capacitor; a virtual Miller capacitor circuit coupled to the bulk capacitor and to the FET; a fast recovery diode coupled to the FET in a parallel configuration; and a direct current (DC) to DC converter coupled to the bulk capacitor and to the FET, the DC to DC converter configured to output a DC voltage to the CPU.

The IHS may further comprise a current source coupled to the bulk capacitor and to the virtual Miller capacitor circuit. A gate terminal of the FET may be coupled to a third terminal of the current source, a drain terminal of the FET may be coupled to a second terminal of the virtual Miller capacitor circuit and to a second terminal of the bulk capacitor, and a first terminal of the current source may be coupled to a first terminal of the virtual Miller capacitor circuit and to a first terminal of the bulk capacitor. The second terminal of the virtual Miller capacitor circuit may be coupled to a non-inverting input of an internal amplifier, the first terminal of the virtual Miller capacitor circuit may be coupled to an inverting input of the internal amplifier, and a third terminal of the virtual Miller capacitor circuit may be coupled to an output of the internal amplifier through a capacitor.

The PSU may also include a rectifier circuit configured to receive AC electrical power, such that the current source is coupled to the rectifier circuit. The virtual Miller capacitor circuit may be configured to control an amount of inrush current provided to the bulk capacitor during a powering on event, and the FET may include a MOSFET.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Conventional power supply unit(s) (PSUs) may include a power-factor correction (PFC) circuit (e.g., a rectifier and boost converter) front-end, followed by a bulky electrolytic capacitor for energy storage, then an isolated DC-DC converter downstream to generate an output DC voltage (e.g., 12 V). The electrolytic capacitor may be designed to address the 120 Hz ripple and to provide a hold-up charge time requirement, so the size of such a capacitor (also referred to as a "bulk" capacitor) is usually large. As described in more detail below, embodiments of systems and methods described herein address one or more of the previously mentioned drawbacks of conventional PSUs by: (a) reducing or eliminating the need for negative temperature coefficient (NTC) thermistors and/or power resistors to control or limit alternating current (AC) inrush currents to the bulk capacitor; and/or (b) reducing and/or minimizing the peak current versus average current ratio for a given bulk capacitor's charging period.

In some implementations, a metal-oxide-semiconductor field-effect transistor (MOSFET) (e.g., approximately 500-600 V) may replace conventional combinations of MOSFET with power resistors or NTC thermistors. Particularly, a MOSFET used in embodiments described herein may be configured to operate in its linear region and it may have a larger impedance to therefore put a limit in the AC inrush current that occurs, for example, in response to and/or during a power-on event (e.g., when an IHS is plugged into an AC outlet and/or when a power or reset button is pressed).

One way to make a MOSFET's gate voltage stay at a lower value is to take advantage of the so-called "Miller capacitance." As used herein, the term "Miller capacitance" or "Miller capacitor" refers to the capacitance that inherently presents itself between a MOSFET's drain and gate terminals when used in certain DC applications. In AC applications, however, the half-sine wave profile prohibits the use of MOSFET's Miller capacitance to control the gate charge current.

Accordingly, in order to provide an artificial and/or additional capacitance between the drain and gate terminals of the MOSFET, a "virtual Miller capacitor" circuit may be used in some embodiments. Generally speaking, a virtual Miller capacitor may be configured to generate a voltage point which is logically negative to bulk capacitor voltage and a current which is proportional to Bulk capacitor's dV/dt ("inrush current"). In this way, most or all of the MOSFET's gate charge current may be diverted to the virtual Miller capacitor, such that the gate voltage does not increase further and the MOSTFT continues to operate at its plateau region.

Figure 1:
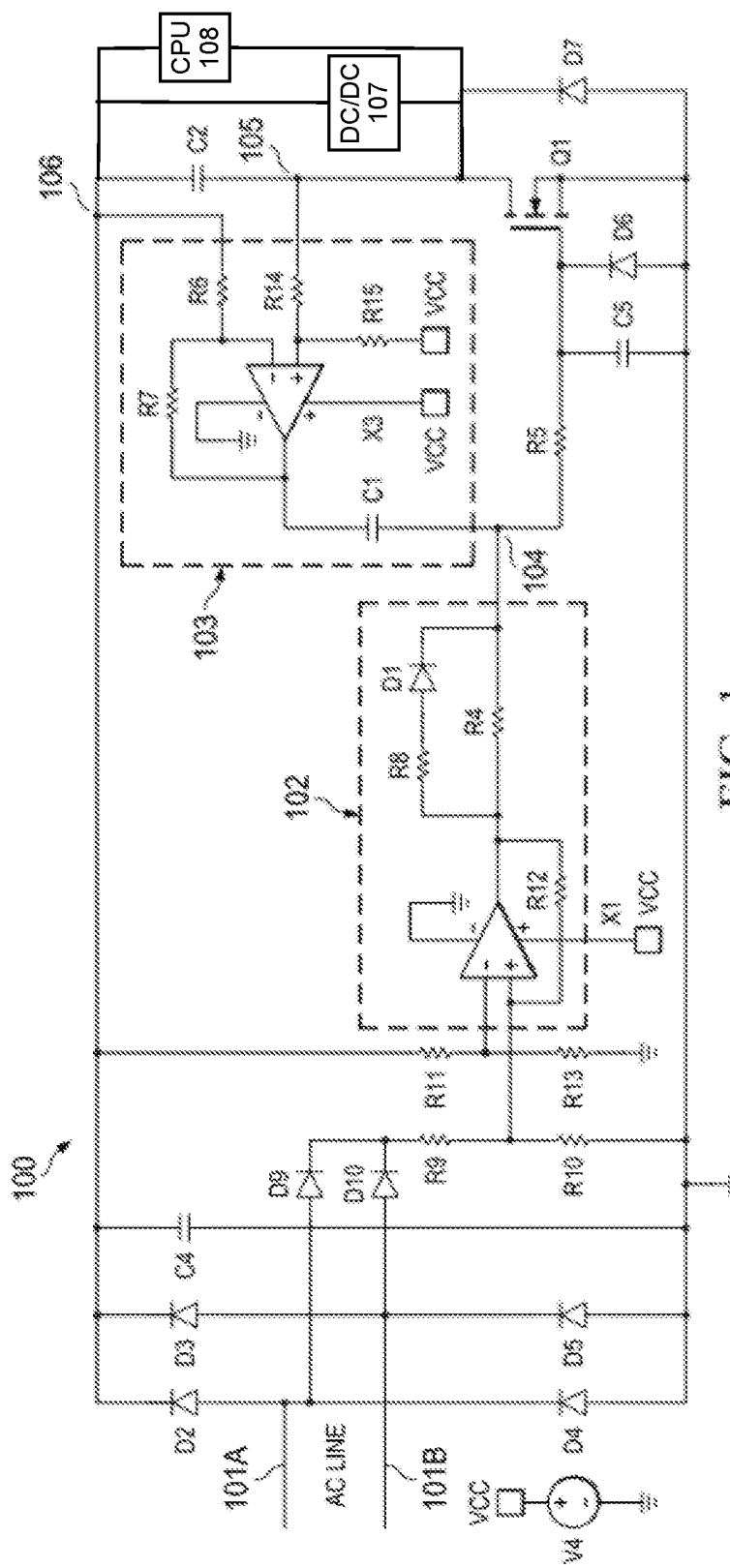
FIG. 1 is a circuit diagram of an example of a portion of a power supply unit (PSU), according to some embodiments.

To illustrate the foregoing, FIG. 1 is a circuit diagram of an example of a portion of PSU 100, according to some embodiments. As shown, the front-end of PSU 100 includes AC line inputs 101A-B coupled to rectifier and power correction circuitry that includes diodes D2-D5, capacitor C4, diode D9, and resistors R9-R11, in the configuration shown. The front-end portion is coupled to bulk capacitor C2 and to field-effect transistor Q1 (e.g., a MOSFET). Current source 102 is coupled to the gate terminal of MOSFET Q1 via components R5, C5, and D6. Fast recovery diode D7 (e.g., 500V~600V) is coupled between the drain and source terminals of MOSFET Q1. Virtual Miller capacitor circuitry 103 provides an additional Miller effect between the drain and gate terminals of MOSFET Q1.

Current source 102 includes a first terminal coupled to node 106 via resistor R11, a second terminal coupled to AC line 101A via diode D9 and resistor R9, and a third terminal coupled to node 104. Virtual miller capacitor circuitry 103 includes a first terminal coupled to node 106, a second terminal coupled to node 105, and a third terminal coupled to node 104. Bulk capacitor C2 includes a first terminal coupled to node 106 and a second terminal coupled to node 105.

The gate terminal of MOSFET Q1 is coupled to the third terminal of current source 102 at node 104 via resistor R5, capacitor C5, and Zener diode D6. In some cases, the breakdown voltage for Zener diode D6 may be approximately 12 V. The drain terminal of MOSFET Q1 is coupled to the second terminal of bulk capacitor C2 at node 105 and to a reference node or voltage (e.g., ground) via diode D7. The source terminal of MOSFET Q1 is also coupled to the reference node. The first terminal of current source 102 is coupled to the first terminal of virtual Miller capacitor circuit 103 and to the first terminal of bulk capacitor C2 at node 106.

In this example, the second terminal of virtual Miller capacitor circuit 103 is connected to inside resistor R14 coupled to a non-inverting input of amplifier R14. The first terminal of virtual Miller capacitor circuit 103 is coupled to the inverting input of amplifier X3 via resistor R6, and the third terminal of virtual Miller capacitor circuit 103 is coupled to the output of amplifier X3 through capacitor C1. Resistors R7 and R15 are configured as shown. Current source 102 includes comparator X1, resistors R4, R8, and R12, as well as diode D1, further configured as shown.

As may be seen from the circuit implementation of FIG. 1, bulk capacitor C2 (e.g., 450 uF) is in series with MOSFET Q1 (e.g., 600 V). Losses in MOSFET Q1 are minimal, as it is not in series with the main power path. The inrush current through MOSFET Q1 in set at a constant value by making use of virtual Miller capacitance 103. The virtual Miller capacitive circuit 103 includes amplifier X3 configured to generate a "negative" bulk capacitor voltage, thus emulating the otherwise inherent MOSFET Miller capacitance present in DC applications. For example, in some cases, the output of amplifier X3 may be set just below $V_{CC}$ supply voltage (e.g., 15 V) from primary bias V4.

Current source 102 includes comparator X1 configured to generate a preset current source (e.g., 2 mA). Comparator X1 is also configured to sink current when a the rectified AC voltage is lower than bulk capacitor C2's voltage (e.g., at zero crossing). That is, when rectified AC voltage after D9-D10 and a resistor divider (at the non-inverting input of X1) is lower than the DC bus voltage 106 after a resistor divider (at the inverting input of X1), the output of X1 is pulled low to sink current, such that current does not flow through that virtual miller capacitor path when there is no current flowing through bulk capacitor C2, therefore maintaining the integrity of the effect of virtual Miller capacitor 103. Components R8 and D1 may be used to generate a source current larger than the sink current.

In operation, at beginning of a power on or reset event, there is no charge across bulk capacitor C2 and, MOSFET Q1 is held in an OFF state, so no current flows through bulk capacitor C2 or MOSFET Q1. Then current source 102 starts to charge MOSFTET Q1's gate, and once it reaches gate threshold, MOSFET Q1 enters into the conduction region and current starts to flow through bulk capacitor C2 and MOSFET Q1. The AC inrush current due to the power on event increases to a value which is proportional to the current provided by current source 102 and inversely proportional to the value of capacitor C1 (e.g., 3.5 A). At that preset value, all current from current source 102 is diverted to capacitor C1 and the gate of MOSFET Q1 is not charged anymore; thus keeping MOSFET Q1 operating in its plateau region. As a result, the inrush current is maintained (e.g., at 3.5 A) so long as the value of the DC bus is greater than the voltage across bulk capacitor C2. When the AC input current goes lower, for example near zero crossing, the AC inrush current goes to zero.

PSU 100 may also include a DC-DC converter 107 coupled to node 106 and to the source of MOSFET Q1—that is, in parallel with bulk capacitor C2 and MOSFET Q1. The output of such a DC-DC converter produces an output DC voltage, such as, for example 12 V. This output DC voltage may then be used to power one or more electronic components or circuits within an IHS such as, for example, CPU 108 or another component of the IHS described in FIG. 4 below.

Figure 2:
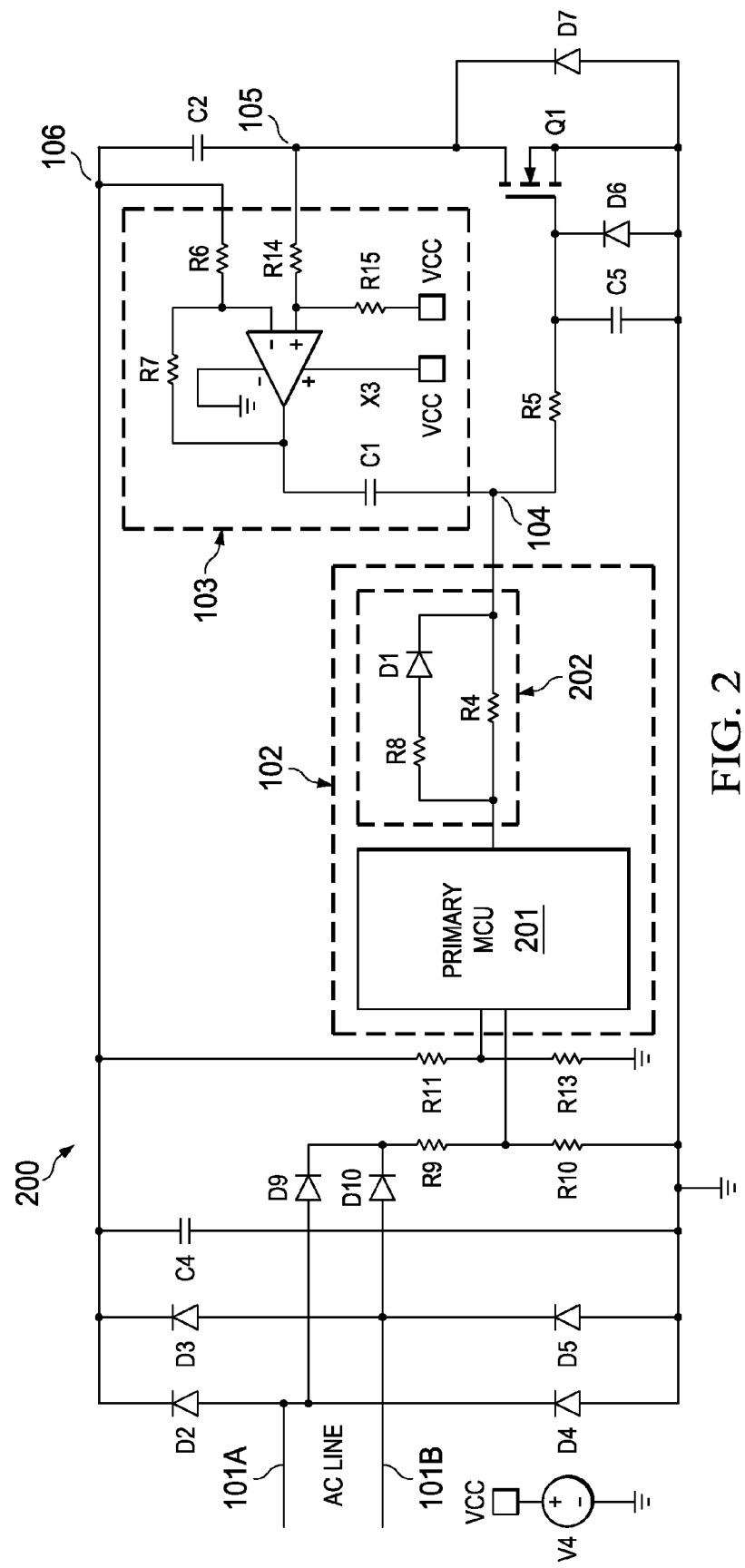
FIG. 2 is a circuit diagram of another example of a portion of a PSU, according to some embodiments.

FIG. 2 is a circuit diagram of another example of a portion of a PSU. In this implementation, embodiment 200 uses a comparator provided microcontroller unit (MCU) 201 with components 202 that include resistors R4 and R8, as well as diode D1, replacing current source 102 of FIG. 1.

Figure 3:
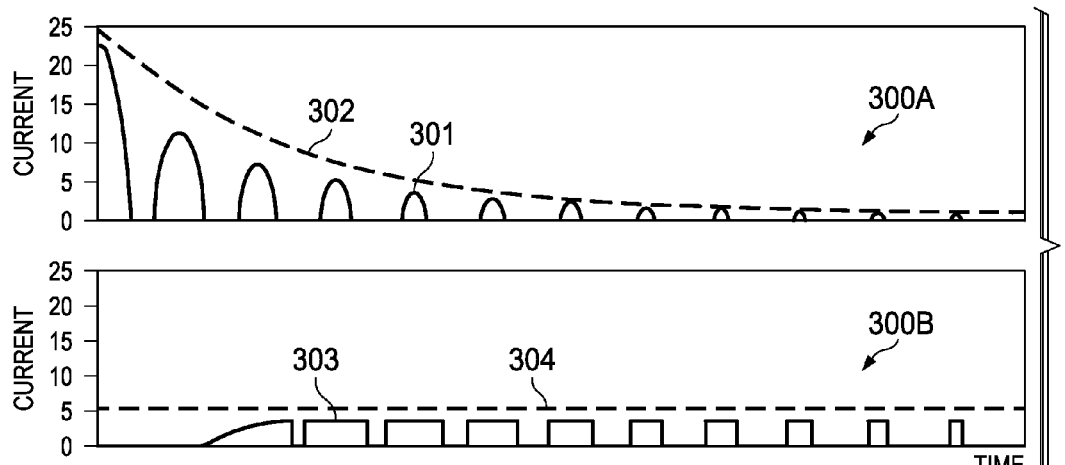
FIG. 3 is graph comparing AC inrush currents of different PSU implementations, according to some embodiments.

FIG. 3 is graph comparing AC inrush currents of different PSU implementations. Particularly, graph 300A shows the inrush current through bulk capacitor C2 as curve 301 (approximated by curve 302) when using a conventional NTC thermistor or power resistor in series with MOSFET Q1 and in the absence of virtual Miller capacitor 103. In contrast, graph 300B shows the inrush current through bulk capacitor C2 as curve 303 (approximated by curve 304)

when using a circuit such as the one depicted in FIG. 1 or 2; that is, using virtual Miller capacitor 103 and in the absence of an NTC thermistor or power resistor. It should be noted that, the conventional inrush current peak illustrated in graph 300A is about 23 A, whereas graph 300B shows that the inrush current peak when using virtual Miller capacitor 103 is much smaller (and has an approximately constant value) at 3.5 A.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 4:
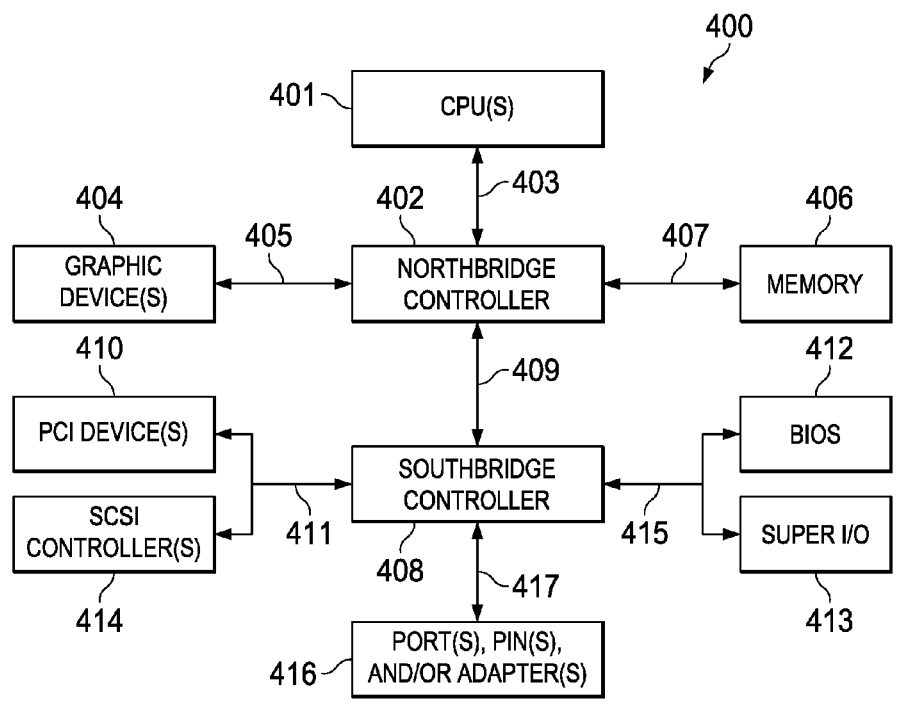
FIG. 4 is a block diagram of an example of an Information Handling System (IHS) according to some embodiments.

FIG. 4 is a block diagram of an example of an IHS. In some embodiments, IHS 400 may be used with a PSU such as, for example, PSUs 100 and/or 200 described in FIGS. 1 and 2, to provide electrical power to one or more of blocks 401-417. As shown, IHS 400 includes one or more CPUs 401. In various embodiments, IHS 400 may be a single-processor system including one CPU 401, or a multi-processor system including two or more CPUs 401 (e.g., two, four, eight, or any other suitable number). CPU(s) 401 may include any processor capable of executing program instructions. For example, in various embodiments, CPU(s) 401 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 401 may commonly, but not necessarily, implement the same ISA.

CPU(s) 401 are coupled to northbridge controller or chipset 401 via front-side bus 403. Northbridge controller 402 may be configured to coordinate I/O traffic between CPU(s) 401 and other components. For example, in this particular implementation, northbridge controller 402 is coupled to graphics device(s) 404 (e.g., one or more video cards or adaptors) via graphics bus 405 (e.g., an Accelerated Graphics Port or AGP bus, a Peripheral Component Interconnect or PCI bus, or the like). Northbridge controller 402 is also coupled to system memory 406 via memory bus 407. Memory 406 may be configured to store program instructions and/or data accessible by CPU(s) 401. In various embodiments, memory 406 may be implemented using any suitable memory technology, such as static RAM (SRAM), synchronous dynamic RAM (SDRAM), nonvolatile/Flash-type memory, or any other type of memory.

Northbridge controller 402 is coupled to southbridge controller or chipset 408 via internal bus 409. Generally speaking, southbridge controller 408 may be configured to handle various of IHS 400's I/O operations, and it may provide interfaces such as, for instance, USB, audio, serial, parallel, Ethernet, or the like via port(s), pin(s), and/or adapter(s) 416 over bus 417. For example, southbridge controller 408 may be configured to allow data to be exchanged between IHS 400 and other devices, such as other IHSs attached to a network (e.g., network 104). In various embodiments, southbridge controller 408 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 408 may also enable connection to one or more keyboards, keypads, touch screens, scanning devices, voice or optical recognition devices, or any other devices suitable for entering or retrieving data. Multiple I/O devices may be present in IHS 400. In some embodiments, I/O devices may be separate from IHS 400 and may interact with IHS 400 through a wired or wireless connection. As shown, southbridge controller 408 is further coupled to one or more PCI devices 410 such as SSDs 105 of FIG. 1 as well as any number of other PCI devices (e.g., modems, network cards, sound cards, or video cards), and to one or more SCSI controllers 414 via parallel bus 411. Southbridge controller 408 is also coupled to BIOS 412 and to Super I/O Controller 413 via LPC bus 415.

BIOS 412 includes non-volatile memory having program instructions stored thereon. Those instructions may be usable CPU(s) 401 to initialize and test other hardware components and/or to load an Operating System (OS) onto IHS 400. Super I/O Controller 413 combines interfaces for a variety of lower bandwidth or low data rate devices. Those devices may include, for example, floppy disks, parallel ports, keyboard and mouse, temperature sensor and fan speed monitoring/control, among others.

In some cases, IHS 400 may be configured to provide access to different types of computer-accessible media separate from memory 406. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 400 via northbridge controller 402 and/or southbridge controller 408.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 400 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 402 may be combined with southbridge controller 408, and/or be at least partially incorporated into CPU(s) 401. In other implementations, one or more of the devices or components shown in FIG. 4 may be absent, or one or more other components may be added. Accordingly, systems and methods described herein may be implemented or executed with other IHS configurations.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   receiving alternating current (AC) power;
   providing the AC power to an electronic circuit, at least in part, via a bulk capacitor coupled to a field-effect transistor (FET), wherein the FET is coupled to a capacitor circuit configured to limit an amount of AC inrush current provided to the bulk capacitor; and
   providing a current source coupled to the bulk capacitor and to the capacitor circuit, wherein a gate terminal of the FET is coupled to a third terminal of the current source, a drain terminal of the FET is coupled to a second terminal of the capacitor circuit and to a second terminal of the bulk capacitor, and a first terminal of the current source is coupled to a first terminal of the capacitor circuit and to a first terminal of the bulk capacitor.

2. The method of claim 1, wherein the second terminal of the capacitor circuit is coupled to a non-inverting input of an internal amplifier, wherein the first terminal of the capacitor circuit is coupled to an inverting input of the internal amplifier, and wherein a third terminal of the capacitor circuit is coupled to an output of the internal amplifier.

3. The method of claim 1, further comprising providing a rectifier circuit configured to receive the AC power, the current source coupled to the rectifier circuit.

4. The method of claim 1, wherein FET includes a metal-oxide-semiconductor FET (MOSFET).

5. A circuit, comprising:
   a bulk capacitor;
   a field-effect transistor (FET) coupled to the bulk capacitor;
   a capacitor circuit coupled to the bulk capacitor and to the FET;
   a fast recovery diode coupled to the FET in a parallel configuration; and
   a current source coupled to the bulk capacitor and to the capacitor circuit, wherein a gate terminal of the FET is coupled to a third terminal of the current source, a drain terminal of the FET is coupled to a second terminal of the capacitor circuit and to a second terminal of the bulk capacitor, and a first terminal of the current source is coupled to a first terminal of the capacitor circuit and to a first terminal of the bulk capacitor.

6. The circuit of claim 5, wherein the second terminal of the capacitor circuit is coupled to a non-inverting input of an internal amplifier, wherein the first terminal of the capacitor circuit is coupled to an inverting input of the internal amplifier, and wherein a third terminal of the capacitor circuit is coupled to an output of the internal amplifier.

7. The circuit of claim 5, wherein the PSU further comprises a rectifier circuit configured to receive an alternating current (AC) electrical power, and wherein the current source is coupled to the rectifier circuit.

8. The circuit of claim 5, wherein the capacitor circuit is configured to control an amount of inrush current provided to the bulk capacitor during a powering on event.

9. The circuit of claim 5, wherein FET includes a metal-oxide-semiconductor FET (MOSFET).

10. An information handling system (IHS), comprising:
    a central processing unit (CPU); and
    at least one power supply unit (PSU) coupled to the CPU, the PSU comprising:
       a bulk capacitor;
       a field-effect transistor (FET) coupled to the bulk capacitor;
       a capacitor circuit coupled to the bulk capacitor and to the FET;
       a fast recovery diode coupled to the FET in a parallel configuration;
       a direct current (DC) to DC converter coupled to the bulk capacitor and to the FET, the DC to DC converter configured to output a DC voltage to the CPU; and a current source coupled to the bulk capacitor and to the capacitor circuit, wherein a gate terminal of the FET is coupled to a third terminal of the current source, a drain terminal of the FET is coupled to a second terminal of the capacitor circuit and to a second terminal of the bulk capacitor, and a first terminal of the current source is coupled to a first terminal of the capacitor circuit and to a first terminal of the bulk capacitor.

11. The IHS of claim 10, wherein the second terminal of the capacitor circuit is coupled to a non-inverting input of an internal amplifier, wherein the first terminal of the capacitor circuit is coupled to an inverting input of the internal amplifier, and wherein a third terminal of the capacitor circuit is coupled to an output of the internal amplifier.

12. The IHS of claim 10, wherein the PSU further comprises a rectifier circuit configured to receive an alternating current (AC) electrical power, and wherein the current source is coupled to the rectifier circuit.

13. The IHS of claim 10, wherein the capacitor circuit is configured to control an amount of inrush current provided to the bulk capacitor during a powering on event.

14. The IHS of claim 10, wherein FET includes a metal-oxide-semiconductor FET (MOSFET).

* * * * *